Patented Mar. 17, 1953

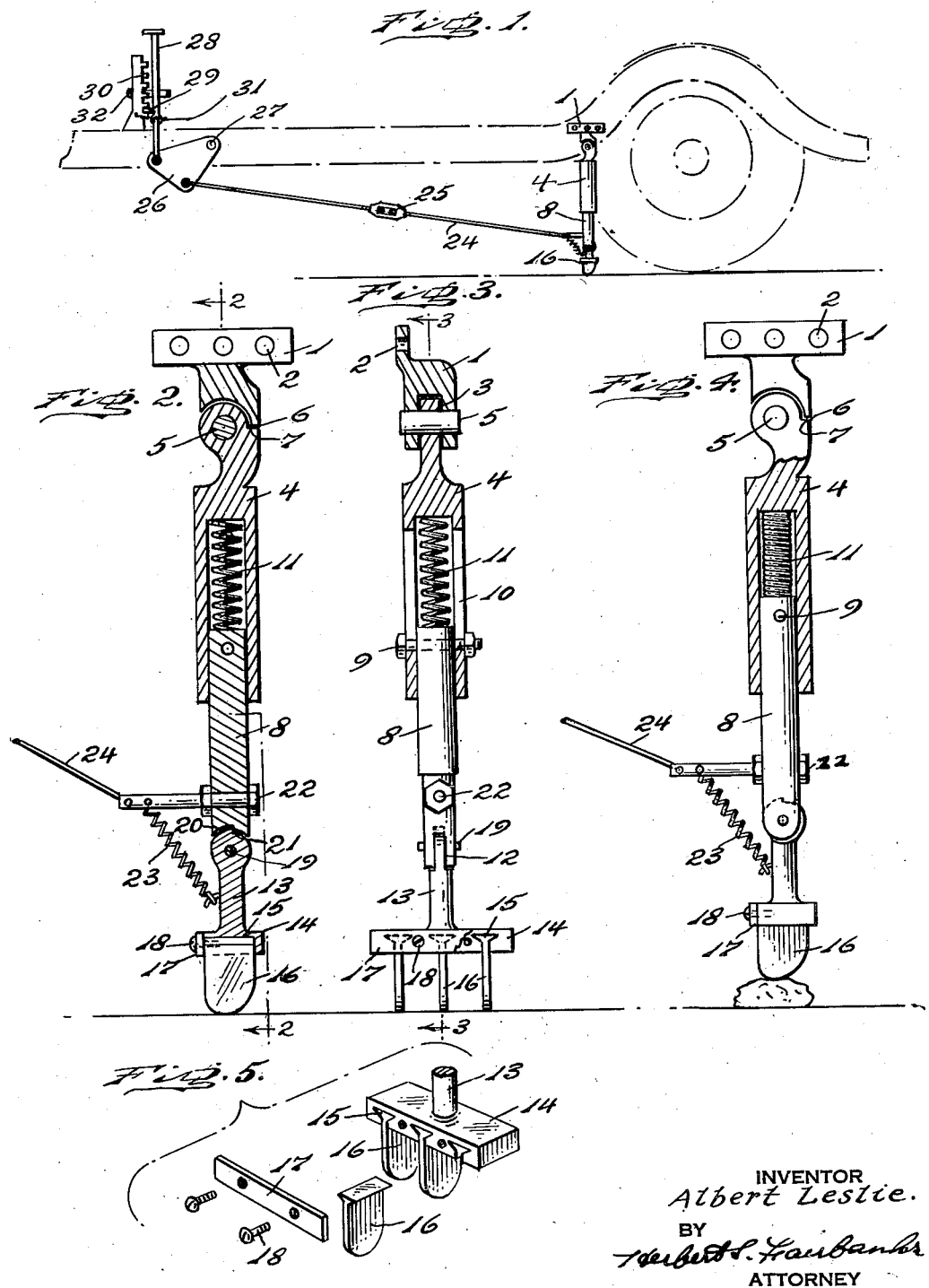

2,631,692

UNITED STATES PATENT OFFICE 2,631,692

SWAY CONTROL FOR MOTOR VEHICLES

Albert Leslie, Shanesville, Pa.

Application September 7, 1951, Serial No. 245,598

2 Claims. (Cl. 188—5)

The object of this invention is to devise a novel sway control for motor vehicles which, under snow and ice road conditions and oily roads will prevent the swaying and skidding of the wheels of the motor vehicle.

A further object of the invention is to devise a novel sway control having the ground engaging elements arranged and assembled for quick removal and replacement in case they should become mutilated or unduly worn without necessitating the removal of the sway control from the vehicle.

A further object of the invention is to provide a novel construction and arrangement of the component parts.

A further object is to provide for the proper positioning of the ground engaging members for forward or rearward movement of the vehicle.

A further object is to provide for the requisite swinging or turning movement in one direction of a carrier and of a support for the ground engaging members.

With the foregoing and other objects in view as will hereinafter clearly appear, my invention comprehends a novel sway control for motor vehicles.

It further comprehends a novel construction and arrangement of a bracket, a carrier, ground engaging members and their support with resilient means to maintain the ground engaging members in contact with the road.

For the purpose of illustrating the invention, I have shown in the accompanying drawings a preferred embodiment of it which, in practice, will give satisfactory and reliable results.

It is, however, to be understood that the various instrumentalities of which the invention consists can be variously arranged and organized, and the invention is not limited except by the scope of the appended claims to the exact arrangement and organization of these instrumentalities as herein shown.

Figure 1 is a side elevation of a sway control embodying my invention, with a portion of a motor vehicle in outline.

Figure 2 is a sectional elevation, the section being taken substantially on line 2—2 of Figure 3.

Figure 3 is a vertical section taken substantially on line 3—3 of Figure 2.

Figure 4 is a sectional elevation similar to that of Figure 2 but showing certain of the parts in raised condition and the spring compressed due to ground obstructions.

Figure 5 is an exploded view of the ground engaging construction.

Similar numerals of reference indicate corresponding parts in the drawings.

Referring to the drawings:

A bracket 1 has openings 2 adapted to receive bolts to secure it to a desired portion of a motor vehicle. The bracket has a slot 3 to receive a carrier 4 secured in such slot by a pivot pin 5. The upper end of the slot and of the carrier are rounded and the wall of the slot is provided with a shoulder 6 which cooperates with a shoulder 7 on the carrier to limit relative turning movement in one direction of the carrier and bracket.

A support 8 in the form of a rod telescopes into the carrier 4 and a bolt 9 passes through the support and through slots 10 in the carrier to limit vertical movement of the support in the carrier. A spring 11 is between the support 8 and the upper end of the slot. The lower end of the support is bifurcated as at 12 to receive the post 13 of a ground engaging member 14 having T-shaped slots 15 to receive the T-shaped heads of knives 16. The knives are retained in position by a bar 17 removably secured to the member 14 by screws 18. The post 13 is secured to the support by a pivot 19, and relative movement in one direction of the member 14 and the carrier 8 is limited by a shoulder 20 on the support and a shoulder 21 on the post. A rod 22 is fixed to the support and a spring 23 has one end fixed to the rod 22 and the other end to the post 13.

A link 24 having a turnbuckle 25 for longitudinal adjustment is pivoted at one end to the rod 22 and its opposite end to a triangular plate 26 pivoted at 27 to the vehicle. A handle 28 is linked to the plate 26 and has a stud 29 to engage the teeth 30 of a rack 31 fixed to a portion of the vehicle such as the running frame. A holder 31 carried by the rack and surrounding the handle limits relative lateral movement of the handle.

The operation will now be apparent to those skilled in the art and is as follows:

Assuming that the sway control has been connected to a vehicle as shown, it will be understood that the ground engaging members formed by the knives 16 are positioned between the rear wheels of the vehicle and in contact with the road. The bottom faces of the ground engaging members are rounded and if an obstruction in the road is hit, the ground engaging members can pivot rearwardly against the tension of the spring 23 which latter returns the ground engaging members to their normal vertical position as soon as the obstruction is passed.

The support is free to move upwardly and the spring 11 maintains it in its normal downward position.

The handle 28 is in a position accessible to the driver of the motor vehicle and can be raised to rock the plate 26 and thereby move the support 8 and the ground engaging members forwardly and upwardly out of contact with the road and fix the support and the carrier in their inoperative position.

Rearward pivotal movement of the carrier relatively to the bracket is prevented by the shoulders 6 and 7.

If a knife 16 becomes worn, it can be removed and replaced by a new knife without removing the sway control from the vehicle.

The component parts can be economically manufactured and readily assembled. I have shown a plurality of knives and it will be understood that any desired number can be employed.

Having thus described my invention, what I claim as new and desire to secure by Letters Patent is:

1. In a sway control for motor vehicles, a bracket rigidly attachable to the vehicle frame, a carrier pivotally connected at its upper end to the bracket, said bracket and carrier having means to limit rearward pivotal movement of the carrier, a rod longitudinally movable in the carrier, said rod and carrier having means to limit their relative longitudinal movement and to prevent rotation of the rod in the carrier, a ground engaging member pivoted to the lower end of the rod, said rod and member having cooperating shoulders permitting free rearward pivotal movement of the member but preventing forward pivotal movement of the member when the latter is in longitudinal alignment with the rod, a spring tending to move the member forwardly, and means under the control of the operator of the vehicle to move the rod and thereby move the member into its ground engaging position.

2. The construction defined in claim 1 wherein the ground engaging member has a plurality of ground contacting knives rigidly keyed at their upper ends to said member.

ALBERT LESLIE.

REFERENCES CITED

The following references are of record in the file of this patent:

UNITED STATES PATENTS

| Number | Name | Date |
|---|---|---|
| 1,008,354 | Moore | Nov. 14, 1911 |
| 1,021,779 | Janek | Apr. 2, 1912 |
| 1,643,959 | Sebell | Oct. 4, 1927 |
| 1,982,792 | Clausen | Dec. 4, 1934 |
| 2,171,352 | Beavan | Aug. 29, 1939 |

FOREIGN PATENTS

| Number | Country | Date |
|---|---|---|
| 614,159 | Germany | June 3, 1935 |